(12) United States Patent
Kemper et al.

(10) Patent No.: US 11,666,970 B2
(45) Date of Patent: Jun. 6, 2023

(54) SYSTEMS AND METHODS FOR CONTINUOUS PRODUCTION OF GAS ATOMIZED METAL POWDERS

(71) Applicants: BeeMetal Corp., New York, NY (US); Tenova S.p.A., Castellanza (IT)

(72) Inventors: Kevin Kemper, Pasadena, CA (US); Terry Hunsicker, Kingman, AZ (US); Gus Hiller, Sewanee, TN (US); Kyle Shoop, Pittsburgh, PA (US)

(73) Assignee: BEEMETAL CORP and TENOVA S.P.A., Pasadena, CA (US)

( * ) Notice: Subject to any disclaimer, the term of this patent is extended or adjusted under 35 U.S.C. 154(b) by 200 days.

(21) Appl. No.: 16/546,189

(22) Filed: Aug. 20, 2019

(65) Prior Publication Data

US 2020/0122237 A1    Apr. 23, 2020

Related U.S. Application Data

(60) Provisional application No. 62/721,615, filed on Aug. 23, 2018.

(51) Int. Cl.
*B22F 9/08* (2006.01)
(52) U.S. Cl.
CPC ........ *B22F 9/082* (2013.01); *B22F 2009/088* (2013.01); *B22F 2009/0848* (2013.01); *B22F 2998/10* (2013.01)
(58) Field of Classification Search
CPC .................. B22F 9/082; B22F 2009/0848
(Continued)

(56) References Cited

U.S. PATENT DOCUMENTS

| 4,921,222 A | 5/1990 | Mott |
| 5,753,004 A | 5/1998 | Hanai et al. |

(Continued)

FOREIGN PATENT DOCUMENTS

| CN | 101191171 A | * 6/2008 |
| CN | 104232898 | 12/2014 |

(Continued)

OTHER PUBLICATIONS

International Search Report and Written Opinion for International Application No. PCT/US2019/047345 dated Nov. 14, 2019.
(Continued)

*Primary Examiner* — Weiping Zhu
(74) *Attorney, Agent, or Firm* — Edmonds & Cmaidalka, P.C.

(57) ABSTRACT

Raw material feed into an electric arc furnace ("EAF") is melted into heated liquid metal at a controlled temperature with impurities and inclusions removed as a separate liquid slag layer. The heated liquid metal is removed from the EAF into a passively heatable ladle wherein it is moved into a refining station where they are placed into a inductively heated refining holding vessel and wherein vacuum oxygen decarburization is applied to remove carbon, hydrogen, oxygen, nitrogen and other undesirable impurities from the liquid metal. The ladle and liquid metal is then transferred to a refining station/gas atomizer having a controlled vacuum and inert atmosphere wherein the liquid metal is poured from an inductively heated atomizing holder vessel into a heated tundish at a controlled rate wherein high pressure inert gas is applied through a nozzle to create a spray of metal droplets forming spherical shapes as the droplets that cool and fall into a bottom formed in the chamber. Spherical powder comprising the droplets are removed from the (Continued)

chamber through screen and blenders and then classified by size.

8 Claims, 5 Drawing Sheets

(58) Field of Classification Search
USPC .......................................................... 75/331
See application file for complete search history.

(56) References Cited

U.S. PATENT DOCUMENTS

| | | |
|---|---|---|
| 6,696,013 B2 | 2/2004 | Wunsche |
| 2012/0326365 A1 | 12/2012 | Properzi |
| 2015/0059526 A1* | 3/2015 | Vikner .................. B22D 41/14 75/338 |
| 2017/0209922 A1 | 7/2017 | Kato et al. |
| 2021/0101211 A1 | 4/2021 | Memoli et al. |

FOREIGN PATENT DOCUMENTS

| | | |
|---|---|---|
| EP | 0134336 | 3/1985 |
| EP | 3609643 | 2/2020 |
| JP | 54139870 | 10/1979 |

OTHER PUBLICATIONS

European Extended Search Report for European Application No. 19852433.2 dated Apr. 7, 2022.

* cited by examiner

210 — Receiving a passively heatable ladle containing molten metal from refining station, wherein a process of vacuum oxygen degassing is applied to remove undesirable impurities, inclusions or gasses from the molten metal, into a atmosphere controlled gas atomizer station wherein a heated holding vessel contains the passively heatable ladle and molten metal and is tilted within the gas atomizer to pour the molten metal into a heated tundish at a controlled rate while continuing to control the liquid metal temperature in the passively heatable ladle by induction heating and while simultaneously applying high pressure inert gas through a nozzle to the tundish to produce a spray of droplets in the atomizing chamber and forming spherical shapes as the droplets cool and fall to a bottom formed in the atomizing chamber 215 — Removing the passively heatable ladle once emptied of molten metal and repeating the process for subsequent passively heatable ladles containing molten metal and received by the atmosphere controlled gas atomizer station

SYSTEMS AND METHODS FOR CONTINUOUS PRODUCTION OF GAS ATOMIZED METAL POWDERS

INVENTION PRIORITY

The present application claims priority as a nonprovisional continuation application to U.S. Provisional Patent Application Ser. No. 62/721,615, entitled "SYSTEMS AND METHODS CONTINUOUS PRODUCTION OF GAS ATOMIZED METAL POWDERS", which was filed Aug. 23, 2018, and is hereby incorporated by reference.

TECHNICAL FIELD

Embodiments of the present invention are generally related to systems and methods for producing atomized metal powders. More particularly, the embodiments are related to systems and methods enabling the continuous production of gas atomized metal powders. Additionally, the embodiments are related to systems and methods enabling the continuous production of gas atomized metal powders useful as raw material for additive manufacturing, metal injection molding ("MIM") and other production processes utilizing metal powder.

BACKGROUND

Gas atomized metal powders are commonly used in the additive manufacturing (3D printing) and MIM markets. These industries require highly specific powders with demanding requirements regarding, size, shape and chemistry. Physically the metal powders should have a controlled and uniform density, grain size and shape. These physical characteristics allow for powders that are free flowing and densely pack, minimizing voids between particles, and that can form even layers when stacked. Chemically, the powders should have very controlled characteristics. For example, there are very specific ranges for nickel ("Ni"), cobalt ("Co") and carbon ("C") levels in stainless steel and super alloy powders. This metallic chemistry can be controlled by the raw material inputs used to make the liquid metal for atomizing. The powders should also be very low in atmospheric gases such as oxygen, nitrogen and hydrogen. These gas levels are also generally controlled by the raw material inputs, but can also be controlled by certain refining steps, as well as ensuring that once the metal for atomizing is in a hot liquidus state its contact with the ambient atmosphere is minimized.

The primary commercial method used to produce and supply metal powders with the appropriate physical and chemical characteristics for the additive manufacturing and MIM markets is an approach called vacuum induction gas atomization ("VIGA"). In this process a vacuum induction melting furnace is combined with an inert gas atomizer. The starting raw materials (generally pre-cast bars of the appropriate alloy) are melted using electromagnetic induction under vacuum and/or in an inert gas atmosphere. Once a homogeneous melt and the appropriate chemical composition have been achieved, the material is poured into a tundish generally by tilting the furnace. A metal stream then flows from the bottom of the tundish into the atomization nozzle system where it is subject to high-pressure, inert-gas and is atomized into droplets that solidify in the atomization chamber and form powder with a controlled size distribution and spherical shape. Patents related to this type of powder production include U.S. Pat. Nos. 4,343,750, 4,272,463, 3,695,795 and 3,752,611.

There are certain drawbacks and inefficiencies in the VIGA production process. Firstly, the production process is inefficient and slow. A VIGA system incorporates all phases of the metal powder production processes into a single unit. Melting, refining and atomizing all occur in one fully connected and sealed unit. The induction melting furnace and tundish are held within a vacuum chamber that is connected to the atomization chamber. Once the melting furnace is sealed within the vacuum chamber, the entire processes should be completed before the chamber can be opened and the induction furnace can be refilled for melting the next heat. This means that the production of metal powders is in batches and not via a continuous process. A typical production run of metal powder can take nearly four hours and can summarized as below:

1. Fill induction furnace— 5 minutes
2. Melt—60 minutes
3. Refine—30 minutes
4. Chemistry adjustments—40 minutes
5. Atomize—50 minutes (@ 10 kg/min)
6. Tundish change—45 minutes Step 1 of the next production heat cannot begin until all 6 steps are completed. This means the atomizing portion of the VIGA system is only in use for about 15-20% of total operating time. Secondly, because the induction melting furnace is sealed within the vacuum chamber, only limited chemistry adjustments can be made. This drawback limits the flexibility and types of raw materials that can be used as feedstock. This means that the primary raw material input for a VIGA system is pre-cast metal bars very close to the appropriate alloy chemistry desired for atomizing. An example of this drawback that is apparent when making stainless steel powders is carbon content. Stainless steel powders generally require very low carbon levels. Having the induction furnace sealed in the vacuum chamber eliminates the ability to remove carbon through oxygen injection refining. Thus, a more expensive low carbon raw material must typically be used. There is also no ability to remove inclusions or deleterious elements through a slag process. "Slagging" is a process in metallurgy whereby certain combinations of lime (CaO) and dolomitic lime (CaO—MgO "dololime") can be added to a melting furnace to remove impurities in the raw material charge once the metal is liquidus. These impurities can consist of carbon as gaseous carbon monoxide, and silicon, manganese, phosphorus and some iron as liquid oxides, which combine with lime and dolime to form the slag. At the end of the melting operation, the liquid metal is tapped (poured) into a ladle while the slag is typically removed through a separate opening, door or tap hole, so it does not mix with the liquid metal going into the ladle. The sealed induction furnace in a VIGA system has no ability to appropriately charge slag formers, nor the space or ability to remove the slag separately from the metal. The lack of a slag process again restricts the types of raw materials that can be charged into the induction furnace.

Thirdly, because melting in the induction furnace occurs only after the vacuum and inert gas chamber is sealed, to maximize the production of each heat, the melting furnace must be efficiently packed with solid, dense metal inputs. There is thus a limited shape and size of material to be charged. Furthermore, handling and placement of this material into the furnace is another limitation on size and shape. Ultimately this generally requires specifically sized pre-cast ingots or bars. These raw material limitations greatly increase the cost and decrease the flexibility of raw materials available for charging a VIGA production system. These bars must be prepared previously so that they have the desired composition, shape and size. The bars are generally produced by suppliers in advance using known melting, refining, forming and solidifying technologies and they are sold to atomizing facilities as "raw materials". Operators of VIGA furnaces must therefore pay a premium for these bars and ingots and are limited to those chemistries that are available from suppliers, rather than being able to create their own.

Certain other production systems have attempted to improve upon the VIGA production systems to create a more continuous production process and/or to include Electric Arc Furnace (EAF) technology. These are not widely utilized and have certain of their own drawbacks. Examples of these systems are described in patent documents JPS54139870, GB2081748 and EP3173499. In these prior production systems, the melting furnace is separate from the atomizer and liquid metal is transferred in a ladle from the melting station to the atomization station. The ladles then bottom pour the liquid metal to the atomizer through a slide gate. The bottom pour method allows the ladle to be physically connected to the atomizing chamber so discharge of the liquid metal to the nozzle system is done in a semi-controlled atmosphere limiting, but not eliminating, undesirable absorption of oxygen and other undesirable gases from the ambient air. This gas absorption would make the powder unsuitable for most current applications of additive manufacturing or MIM.

A further drawback to the slide gate systems is that they require a certain minimum flow rate and quantity of metal to successfully operate. Commercial suppliers of slide gate systems for hot metal ladles require a minimum volume of 5 metric tonnes and a flow rate of 200 kilograms per minute. This flow rate is much larger than the flow rates (10-20 kgs/min) at which current nozzle technologies operate to produce metal powders appropriate for additive manufacturing and MIM. Furthermore, as designed in the current art, any tip pouring of liquid metal from the ladles to an atomizer would not be conducted in a controlled atmosphere chamber, as the systems are designed for the ladle to directly deliver metal to the atomizer, thus subjecting the metal to undesirable gas interactions with oxygen and nitrogen. This gas absorption would make the powder unsuitable for most applications of additive manufacturing or MIM.

Another problem in the current art is with managing heat loss in ladles when transporting the liquid metal from the melting station to the atomizing station, and during tapping from the ladle to the atomizer. A certain minimum temperature above liquidus is required when atomizing. There are two ways to achieve this minimum. The first is to "super heat" the metal when melting to a temperature at a level above liquidus enough to allow for some cooling that would be experienced during transfer and tapping of the material. The second option is to add heat while the metal is in the ladle to maintain a steady temperature. Super heating does not allow for flexibility in production timing or delays and leads to the risk of metal freezing in the ladle. Superheated metal also has a greater tendency to oxidize the material if it is exposed to air.

Heated ladles, through resistant heating as described in patent GB2081748, or through induction heating, are a better solution; however, significant drawbacks are designed into and experienced by using this option. Furthermore, the heated ladles must typically have a power source, such as an electrical connection as in patent GB2081748, and, in the case of induction heating, must generally include water cooling for the induction coil. Each of these connections would need to either transfer with the ladle or be disconnected and re-connected at each station. This poses a significant operational inefficiency and risk.

In the prior art for metal powder systems, certain refining capabilities exist. However, in all cases the refining is entirely completed in the melting furnace, either EAF or induction. Conducting all refining in the melting furnace constrains the type of refining that is possible and creates an inefficient process. Refining cannot occur at the same time as melting, which happens where the melting and refining stations are separate. What is needed are systems and methods that enable the continuous production of gas atomized metal powders that can overcome the shortcomings of the current state of the art.

SUMMARY OF THE EMBODIMENTS

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

Embodiments relate to methods for the continuous production of gas atomized metal powders for use as raw material for additive manufacturing, metal injection molding ("MIM") and other production processes utilizing metal powder.

In accordance with a feature of the embodiments, it is a feature to provide for the continuous production of gas atomized metal powders by providing systems and methods for receiving a passively heatable ladle containing molten metal from a refining station, wherein a process of vacuum oxygen decarburization can be applied to remove undesirable impurities, inclusions or gasses from the molten metal, into an atmosphere controlled gas atomizer wherein an inductively heated atomizer holding vessel, that can contain the passively heatable ladle and heat molten metal, is tilted within the gas atomizer to pour the molten metal into a heated tundish at a controlled rate while continuing to control the liquid metal temperature in the passively heatable ladle by induction heating from the inductively heated atomizer holding vessel and while simultaneously applying high pressure inert gas through a nozzle to the stream of molten metal flowing down from the tundish to produce a spray of droplets in the atomizing chamber and forming spherical shapes as the droplets cool and fall to a bottom formed in the atomizing chamber.

In accordance with a feature of the embodiments, it is a feature to further provide a production processes that entails feeding a raw material charge of metal scrap and other feedstocks to an electric arc furnace ("EAF"), melting the raw materials to liquid metal at the appropriately controlled temperature and removing certain impurities and inclusions to a separate liquid slag layer, removing or tapping the metal from the EAF into a ladle that is temperature controlled by induction heating, which will be referred to herein as a "passively heatable ladle", by tilting the furnace and pouring through a spout or tap hole, mechanically moving the passively heatable ladle full of molten metal to a refining station whereby the ladle is placed into an induction heated refining holding vessel, placing a sealed cap onto the passively heatable ladle, or the entire refining station is contained within a sealed tank or the holding vessel, and a process of vacuum oxygen decarburization occurs to remove carbon, hydrogen, oxygen, nitrogen and other undesirable impurities, inclusions or gasses in the liquid metal, mechanically transferring the passively heatable ladle from the induction heated refining holding vessel to an induction heated atomizer holding vessel at a gas atomizer, moving the induction heated atomizer holding vessel by a mechanical means (e.g., a hydraulic cylinder) into the gas atomizer's controlled vacuum and inert atmosphere chamber for pouring, controlling the atmosphere in the pouring chamber when a holding vessel is delivered using a series of locks and seals (e.g., doors); tilting the induction heated atomizer holding vessel within the gas atomizer that can also include a controlled atmosphere to pour liquid metal into a heated tundish at a controlled rate to maintain a minimum level of metal in the tundish while continuing to control the liquid metal temperature in the passively heatable ladle by induction heating from the induction heated atomizer holding vessel, applying high pressure inert gas through a nozzle located at the tundish to produce a spray of droplets in the atomizing chamber and forming spherical shapes as the droplets cool and fall to a cone shaped bottom in the atomizing chamber, removing the spherical powder from the atomizing chamber, and passing it through a series of screens and blenders to classify the spherical powder by particle size.

In accordance with another feature, the slag of the EAF can be removed through a separate opening, door or tap hole, so it does not mix with the liquid metal going in the passively heatable ladle.

In accordance with another feature, a passively heatable ladle can be provided that can either be metallic or non-metallic in construction, and can be largely transparent to electromagnetic radiation wavelengths from inductive heating coils allowing for the liquid metal to be heated and stirred while in the passively heatable ladle by induction without overheating the passively heatable ladle itself. This feature is important to the process as it can allow the liquid metal to progress through the respective treatment steps without being exposed to ambient air after the initial tapping of the EAF until it is a solid powder removed from the atomizer.

In accordance with another feature, after the step of moving the passively heatable ladle full of molten metal to a refining station from the EAF, the EAF is prepared for the next charge of raw material and melting can be restarted for the next production heat of liquid metal.

In accordance with another feature, the step of moving the passively heatable ladle full of molten metal to a refining station where the passively heatable ladle is placed into a passively heated refining holding vessel equipped with an induction heating device (e.g., electric coils) adapted for heating ladles can be accomplished using a crane or other mechanism.

In accordance with yet another feature, a sealed cap can be placed on the passively heatable ladle or on the vessel, or the entire vessel can be moved into a sealed tank at a refining station, and a process of vacuum oxygen decarburization can occur to remove carbon, hydrogen, oxygen, nitrogen and other undesirable impurities or gasses in the liquid metal. Resulting slag from the refining process can be removed by skimming, spooning or other methods.

In accordance with yet another feature, the holding vessel can be equipped with an induction heating device suitable for use with the passively heatable ladles, in accordance with the embodiments.

In accordance with another feature, a very thin slag layer can remain on the molten metal surface protecting the liquid metal from the atmosphere.

In accordance with another feature, after the passively heatable ladle is transferred from the refining station to a gas atomizer where metal powder can be produced, the refining station can then be ready to receive another ladle from the EAF.

In accordance with another feature, the atomizer can have a controlled vacuum and inert atmosphere pouring chamber.

In accordance with yet another feature, the gas atomizer can include one or more tilting induction heated atomizer holding vessels equipped with induction heating devices for heating metal through the passively heatable ladles. A first induction heated atomizer holding vessel can receive the ladle outside of the controlled vacuum and inert atmosphere chamber where atomization occurs and can be moved by a mechanical means (e.g., a hydraulic cylinder) into the controlled vacuum and inert atmosphere chamber for pouring after a second induction heated atomizer holding vessel is removed from the chamber, and the first and second holding vessels can alternate placement into the chamber thereby providing a continuous processing stream.

In accordance with another feature, the atmosphere within the atomizing chamber can be controlled by a series of locks and seals (i.e., doors that open and seal when closed) while alternating the positions of the holding vessels or as they are being moved.

In accordance with another feature, liquid metal can be fed from a bottom or opening of the tundish as a controlled metal stream into the atomization nozzle system.

In accordance with another feature, the tundish can also be induction heated to control the temperature of the liquid metal.

In accordance with another feature, the first induction heated atomizer holding vessel can be removed from the pouring station and replaced by a second induction heated atomizer holding vessel after the first induction heated atomizer holding vessel is emptied in the atomizer.

In accordance with another feature, the tundish can be configured to hold enough metal to provide time for the switching of holding vessels while still having a continuous stream of metal to the atomization nozzle system. The second induction heated atomizer holding vessel can hold a second passively heatable ladle filled with liquid metal from the refining station prepared in advance of the completion of atomizing the liquid metal from first holding vessel. In this manner a continuous stream of liquid metal is always available for atomizing because there is always one holding vessel pouring, one available to receive the next passively heatable ladle holding refined liquid metal and a tundish with the capacity to hold enough liquid metal to feed the atomizing nozzle system while the holding vessels are switched.

The aforementioned aspects and other objectives and advantages can now be achieved as described herein.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What will now be described are systems and methods for enabling the continuous production of gas atomized metal powders for use as raw material for additive manufacturing, metal injection molding ("MIM") and other production processes utilizing metal powder. This description is not meant to limit the scope of the embodiments, but is provided to describe a preferred embodiment and alternate features of the embodiments. The scopes of the embodiments are presented within claims provided herein.

The objectives of these new systems and methods are to eliminate the drawbacks associated with current known techniques used to produce metal powder. Specifically, the systems and methods described herein can be used to produce powders of superior quality by minimizing the possibility of oxidation and other gaseous absorption that is inherent in existing metal powder production methods. This can be accomplished via the use of non-metallic or metallic ladles that can allow induction heating of metal or raw material to occur without heating the ladle itself. Such ladles are referred to herein as "passively heatable ladles." This eliminates the need to pour the liquid metal from one vessel to another in any uncontrolled and non-inert atmosphere.

In a first objective of this production system it is preferred to separate the process into three main production steps, (i) melting, (ii) refining and (iii) atomizing, and as distinct activities that occur in parallel and in series. This can dramatically increase throughput and allows for a continuous stream of metal to be delivered to the atomizing nozzle. It also allows for increased quality control as operators can intervene within each production step adding a degree of control not currently available. In particular, the refining step can be more advanced and flexible when not solely constrained to occur in the melting furnace.

A second objective of this production method is to improve efficiency and performance over the VIGA production system for gas atomized metal powders. The VIGA system is the primary commercial production system for gas atomized metal powders though it is an inefficient batch processes that generates metal powder only 15-20% of its operating time, as shown in the following chart.

By contrast, the proposed production method can create a continuous process, as shown in the following chart, whereby metal powders can be produced 100% of the time that the system is in operation. This can dramatically increase throughput and lower operating costs.

A third objective of this is production system is to increase the flexibility of raw materials that can be used as inputs for producing metal powders. Current production systems are largely reliant on pre-cast bars of the desired alloy of metal powder. The proposed production processes can allow for the use of metal scrap and other inexpensive inputs because of the EAF melting and Vacuum Oxygen Decarburization (VOD) system for refining molten metal. The independent EAF allows for slag refining, and a VOD system allows for significantly enhanced degassing and inclusion removal. The EAF also allows a wider variety of shapes and raw material density than an induction furnace.

A fourth objective of the production system is to transfer liquid metal to each production step with the maximum control of temperature and atmosphere. VIGA systems achieve these two aims by having all production steps housed within a single sealed atomizing tower and producing in batches not continuously. Other prior art schemes use bottom tapping ladles, in some cases exposed to atmosphere and/or unheated. Gas absorption and a requirement for superheat are constraints of these transfer ladles systems. Furthermore, ladles with bottom tapping rely on slide gate systems that have a minimum flow rate unsuitable for atomizing nozzles used to make powders for 3D printing. The proposed production system can solve this by using a passively heatable ladle, either metallic or non-metallic in construction, which can be largely transparent to electromagnetic radiation wavelengths allowing for the liquid metal to be heated and stirred while in the passively heatable ladle by induction without overheating the passively heatable ladle itself. This passively heatable ladle can be heated by induction at both the refining and atomizing steps. Furthermore, the passively heatable ladle can be safely lifted in and out of movable holding vessels in the atomizing unit, allowing for tilt pouring at the appropriate flow rate only after the holding vessel has received the ladle and has been moved into a sealed vacuum chamber. Transporting the hot metal from the EAF to the VOD and from the VOD to the atomizer in a single passively heatable ladle eliminates the need for multiple pours or taps, increasing efficiency, safety and product quality. The single passively heatable ladle process ensures that after the metal is refined to the appropriate chemistry and quality specifications it can maintain those characteristics through the metal powder formation process. This provides all the productivity and cost benefits of this new process without sacrificing any of the quality standards of existing processes. The characteristics and advantages of this new method for producing gas atomized metal powders can be better understood when referencing the schematic flow diagram and system illustrated in FIG. 1.

Figure 1:
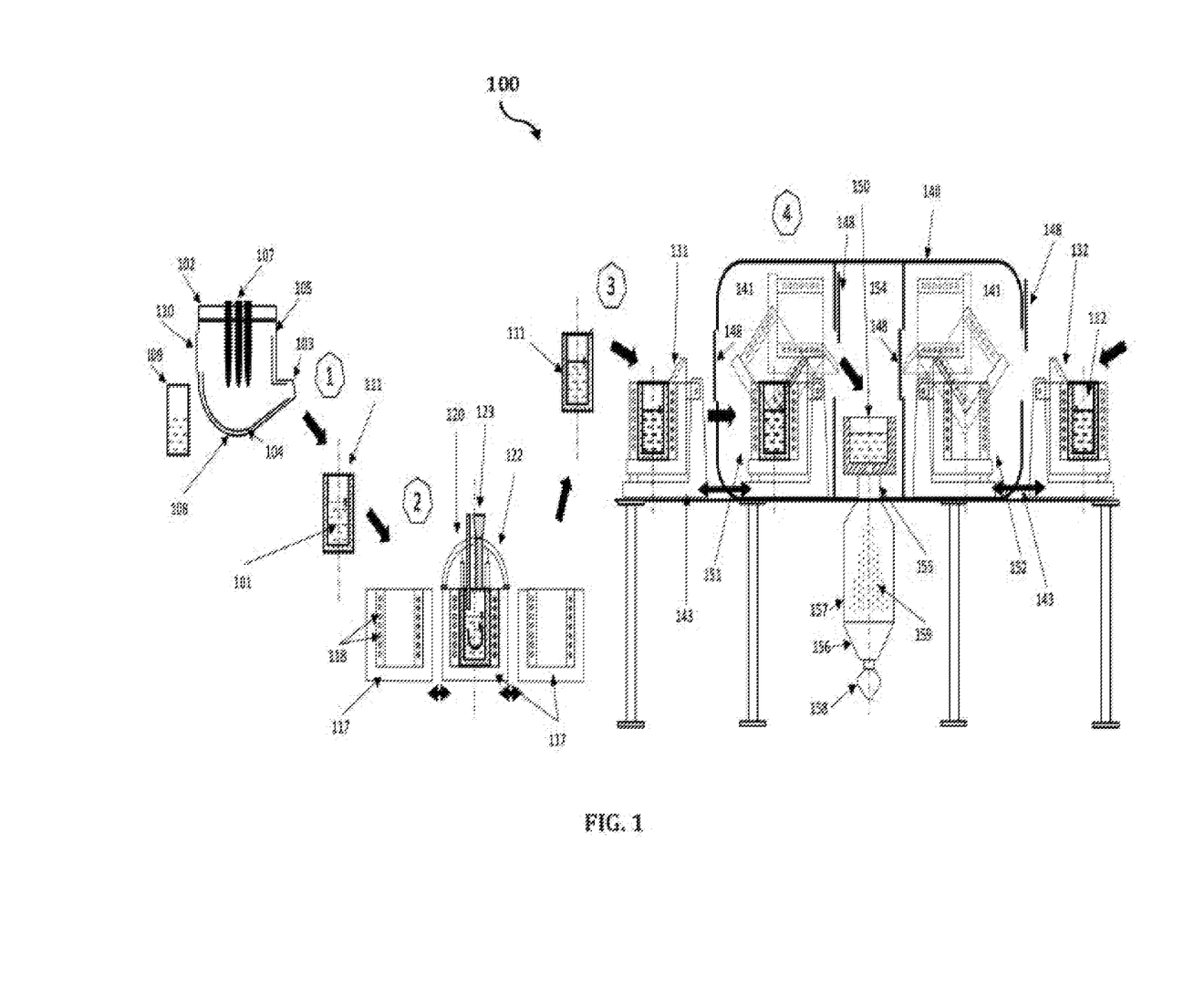
FIG. 1 illustrates a system in accordance with features of the embodiments.

Referring to FIG. 1, the first step in the proposed production processes, indicated by the area marked with hexagon label "1", can melt metallic scrap and other raw materials in an EAF 105. An EAF 105 can include a refractory-lined vessel, which can be water-cooled if needed, and can be covered by a roof 102 through which one or more graphite electrodes 107 enter the furnace. The EAF 105 can comprise a (i) metal shell with a curved bottom 108, (ii) a refractory lining 104, or hearth, within the shell, (iii) and a roof 103 which can be refractory-lined and/or water cooled, through which the one or more electrodes 107 can pass. The electrodes 107 can be made of graphite and can be controlled externally to the EAF 105 by a support and movement system. Electrical current can be fed through the electrodes 107 to form an arc with the metallic charge. This arc can create the heat for melting metal.

The EAF 105 can operate as a batch melting process, producing batches of liquid steel known as "heats". The EAF operating cycle can be referred to as the tap-to-tap cycle and can be made up of the following operations:

Furnace preparation
Furnace charging
Raw materials inching
Liquid metal refining
De-slagging operation through a slag door
Hot metal tapping through a tapping spout

Furnace preparation—Furnace preparation, also called furnace turn-around, is the period following the completion of a previous tapping and until the furnace is ready to charge raw material for the following heat. During this period, the furnace electrodes length below arm clamps can be adjusted, and the furnace's refractory lining can be inspected to check any possible refractory damage. If necessary, repairs can be made to the hearth, slag-line, tap-hole and spout. Repairs to the furnace can be made using gunned refractories or mud slingers.

Furnace Charging— A raw material mix of primarily metal scrap and other metallic bearing products can be charged onto a hopper, where it can be accurately weighed by a high-precision scale, and from the hopper can be fed into the EAF 105 via, for example, a belt and chute system. The raw material can be continuously added into the EAF 105 while it is melting the metal into a liquid state. The raw material charge can also include lime, carbon and other fluxes, that can be charged as lump, along with the raw metal materials, or that can be injected into the molten bath created by melted metal in the EAF 105.

Melting—Electrical current can be fed into the electrodes 107 and an arc can be created with the metallic portion of the raw material mix. The electric arc temperature reaches to 3,000 centigrade. Temperature of the raw material mix can be regulated by raising or lowering the electrodes to maintain a constant power input during melting even as the raw material mix is moved. Due to the particular metal grades to be produced by the proposed process (Stainless steels, high-carbon tool steels, Inconel, other nickel alloys, cobaltchrome and superalloys), the use of chemical power (i.e. burners or oxygen lancing) can be very limited or may actually be avoided, for the preservation of the highly oxidizing metals in the charge. Once the final raw materials are fully charged and melted, the EAF 105 can reach the condition of "flat bath". At this point, a bath temperature and sample can be taken. The analysis of the bath chemistry can allow the furnace operator to determine if chemistry corrections are needed.

EAF Refining— EAF refining operations traditionally involve the removal of phosphorus, sulphur, aluminum, silicon, manganese and carbon. Oxygen reacts with aluminum, silicon and manganese to form metallic oxides, which are slag components. These metals tend to react with oxygen before the carbon. Ideally, oxygen is not to be injected into the EAF 105, so any iron oxide (FeO) present in the raw material mix can be the source of oxygen, to allow reactions like:

Mn+FeO=MnO+Fe

The molten bath can typically reach temperatures above 1600° C. For the following gas atomization process, it can be important to limit the amount of gasses dissolved in the liquid metal. For example with nitrogen in steel, at 1600° C. the maximum solubility in pure iron is 450 ppm.

De-Slagging—a de-slagging operation can be carried out, prior to tapping, to remove the slag from the surface of the liquid bath. Slag has been formed by the additions of lime, dololime and other fluxes that have been added in the raw material mix, and that slag has served two important purposes: cleaning the metal bath from impurities and maintaining a layer of thermal insulation between the liquid bath and the atmosphere. Such slag carries elements that are not desired in the following steps of the process, so it can be removed from the EAF through a slag door 110. The EAF 105 can be tilted back towards the slag door 110, so that the slag can overflow from the EAF 105, out the door 110 into a slag pot 109 or comparable collecting apparatus. The slag can then be allowed to cool and can be appropriately disposed of. In many cases the slag can be used as aggregate or road fill and is thus recyclable.

Tapping— Once the desired hot metal composition and temperature are achieved in the furnace, a tap-hole formed on a furnace spout 103 can be opened, the furnace is tilted, and the metal pours into a passively heatable ladle 111 for transfer to the next operation indicated by the area marked with hexagon label "2". During the tapping process, bulk alloy additions are made based on the bath analysis and the desired steel grade. De-oxidizers can be added to lower the oxygen content prior to further processing.

As shown in the area marked with label "2" in FIG. 1, the second step in the production processes includes the transfer of liquid metal 101 in the passively heatable ladle 111 prior to transport to a VOD 120, which is a refining station for further refining, degassing and metallurgical adjustments of the liquid metal 101.

Ladle transfer— A key differentiation step in the production process once the metal has been tapped from the EAF 105 is the type of ladles and transfer of material to the VOD 120 refining station and ultimately to the atomizer 140. Specifically, the ladles used in the process, either metallic or non-metallic in construction, can be largely transparent to electromagnetic radiation wavelengths allowing for the liquid metal to be heated while in the ladle by induction heating without overheating the ladle itself, thus ladles are referred to herein as a "passively heatable ladle" 111. This type of ladle can be transferred to subsequent process steps without having to expose the metal to ambient air.

The passively heatable ladles 111 can be specifically designed to be easily transported between processing stations and placed into waiting induction heated holding vessels 117. The passively heatable ladle 111 can fit into the induction heated holding vessels 117 like a sleeve. The passively heatable ladles 111 and the induction heated holding vessels 117 can be designed such that the passively heatable ladles fit securely once put into place, however can easily be removed by, for example, a crane for transportation. In this manner, temperature can be maintained in liquid metal through induction heating from coils 118 formed in the induction heated holdings vessels, and the liquid metal does not have to be poured from the ladle into each downstream processing station.

Refining, degassing and secondary metallurgy—The passively heatable ladle 111 can transfer the liquid metal contained therein to the VOD 120, which is a refining station. This refining station can comprise an induction heated refining holding vessel 117 designed to accept the passively heatable ladle and supply induction heating to and stirring of the liquid metal, and a tank or sealed ladle roof 122 to form a vacuum chamber. The tank or roof 122 can be designed with ports 123 to allow alloy additions to the liquid metal. The two primary steps in the refining station can be viewed as:

1. Final adjustment of the metal composition by (i) adding small amounts of ferroalloys into the ladle of molten metal and, if needed, (ii) carbon removal by injecting oxygen under vacuum conditions, to prevent the oxidation of elements other than carbon (the VOD process)
2. Removal of dissolved gasses such as hydrogen, oxygen and nitrogen by processing the molten metal through vacuum degasification. A tank degassing practice can be used (i) to reduce the concentrations of dissolved gases in the liquid metal, (ii) to homogenize the liquid metal composition and bath temperature and (iii) to remove oxide inclusion materials from the liquid metal.

As shown in if FIG. 1, in the area marked with hexagon label "3", the third step in the production processes which is the transfer of liquid metal in a passively heatable ladle 111 to one of the two induction heated atomizer holding vessels 131, 132 and ultimately delivering that vessel to the atomizer 140 for processing to produce metal powder.

De-slagging—The first operation after refining and degassing can be the elimination of any residue of slag from the surface of the bath, which can be a manual operation. This can be done with a spoon, or rake or some other process to remove slag floating on the surface of the liquid metal.

Transfer to the induction heated atomizer holding vessel—The passively heatable ladle 111 can then be lifted by crane and transferred to the atomizer station 140. The atomizer station 140 can be equipped with two tilting induction heated atomizer holding vessels 131, 132. Like the refining station, these induction heated atomizer holding vessels 131, 132 in the atomizer station 140 can be designed such that the passively heatable ladle 111 fits securely into a sleeve. Heat can be maintained in the molten metal by induction heating produced by coils 118, as hereinbefore discussed. Induction heated atomizer holding vessel 131, for example, can receive the passively heatable ladle 111 outside of the controlled vacuum and inert atmosphere chamber 141 of the atomizer station 140 where atomization occurs. The inductively heated atomizer holding vessel 131 can be moved by a mechanical device such as a hydraulic mechanism 143 into the controlled vacuum and inert atmosphere chamber 141 and then into position at the pouring station 154 where it can eventually be poured into a tundish 150. The atmosphere within the atomizing chamber 140 can be controlled by a series of locks and valves, generally depicted as doors 148, operable to create openings in walls of the controlled vacuum an inert atmosphere chamber 141, while the induction heated atomizer holding vessel 131 is put into place therein. These doors 148 can also allow the atmosphere in the pouring station 154 to be maintained while the induction heated atomizer holding vessel 131 when not in use receives a new passively heatable ladle 111 of hot metal and while holding vessels are switched near the tundish 150 into a pouring position to release liquid metal into the tundish 150.

As shown in FIG. 1, in the area marked with hexagon label "4", the fourth step in the production processes is the atomizing of the liquid metal into powder. The atomizer station 140 can be composed of two primary sections: an upper chamber comprised of two receiving areas 151, 152 each to receive respective induction heated atomizer holding vessels, 131, 132 and a central sealed, inert gas and vacuum atmosphere pouring station 154. Induction heated atomizer holding vessels 131, 132 from within the receiving areas can be delivered to the pouring station 154 through the doors 148, which can comprise a system of locks and seals as previously described, to maintain the controlled atmosphere in the pouring station 154. The pouring station 154 can be where liquid metal from one of the induction heated atomizer holding vessels 131, 132 at a time is tilted and delivers a controlled stream of hot metal from the passively heatable ladles 111 to an induction heated tundish 150. This tundish 150 can then deliver metal to the atomizing nozzle 155 located in the lower sealed atomizing chamber 157. The lower sealed atomizing chamber 157 can be a vertical cylinder with a removable conical lower section 156 allowing for easy cleaning prior to a change in powder type.

After receiving a passively heatable ladle 111 from the refining station 120, and being put into place in the pouring station 154, an induction heated atomizer holding vessel 131 can then be tilted to pour liquid metal into a heated tundish 150 at a controlled rate to maintain a minimum level of metal in the tundish 150. While pouring, the liquid metal temperature in the passively heatable ladle 111 can continue to be controlled by induction heating as previously described. The liquid metal from the tundish 150 can be provided as a controlled metal stream into the atomization nozzle 155. The tundish 150 can also be induction heated to control the temperature of the liquid metal. High pressure inert-gas can be applied in the atomization nozzle 155, which creates a spray of droplets that form into atomized metal powder 150 in the atomizing chamber 157 that form spherical shapes as they cool and fall to the cone shaped bottom 156 of the atomizing chamber 157. When induction heated atomizer holding vessel 131 is empty it can be removed from the pouring station and replaced by another induction heated atomizer holding vessel 132. The tundish 150 can hold enough metal to provide time for the switching of induction heated atomizer holding vessels 131,132 while still having a controlled, continuous stream of metal to the atomization nozzle 155. Subsequently loaded induction heated atomizer holding vessel 132 can also hold a second passively heated ladle 112 filled with liquid metal from the VOD 120 refining station prepared in advance of the completion of atomizing the liquid metal from the first (prior) induction heated atomizer holding vessel 131. In this manner a continuous stream of liquid metal is always available for atomizing because there can always be one holding vessel pouring and one available to receive the next ladle of refined liquid metal. The spherical powder 159 can be removed from the bottom (e.g., cone shaped bottom 156) of the atomizing chamber at a discharge hopper 158 where it can then be processed through a series of screens and blenders to classify the product by particle size.

Figure 2:
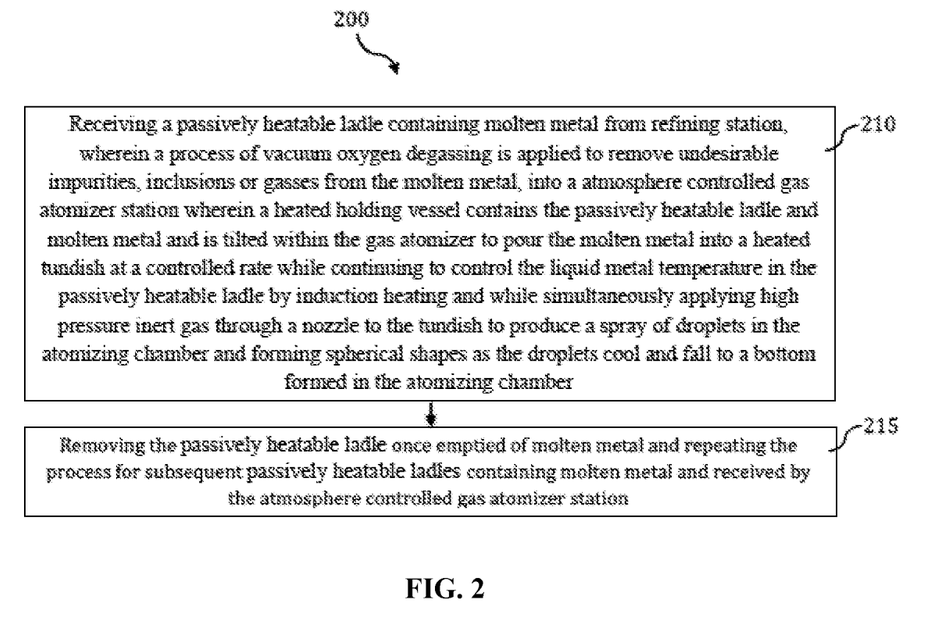
FIG. 2 illustrates a flow diagram for a process in accordance with features of the embodiments.

Referring to FIG. 2, a flow diagram illustrates a method in accordance with features of the embodiments. In Block 210, the diagram illustrates a step of receiving a passively heatable heated ladle 111 containing molten metal from refining station 120, wherein a process of vacuum oxygen decarburization was applied to remove undesirable impurities, inclusions or gasses from the molten metal, into a atmosphere controlled gas atomizer station 140 wherein an inductively heated atomizer holding vessel 131 contains the passively heatable ladle 111 and the molten metal contained therein and is tilted within the gas atomizer to pour the molten metal into a heated tundish 150 at a controlled rate while continuing to control the liquid metal temperature in the passively heatable ladle 111 by induction heating and while simultaneously applying high pressure inert gas through a nozzle to the stream of molten metal flowing out from the tundish 150 to produce a spray of droplets in a atomizing chamber 157 and forming spherical shapes as the droplets cool and fall to a bottom formed in the atomizing chamber 157. Then as shown in Block 215, there is shown a step of Removing the passively heatable ladle 111 once emptied of molten metal and repeating the process for subsequent passively heatable ladles 112 containing molten metal and received by the atmosphere controlled gas atomizer station 140 for processing.

Figure 3:
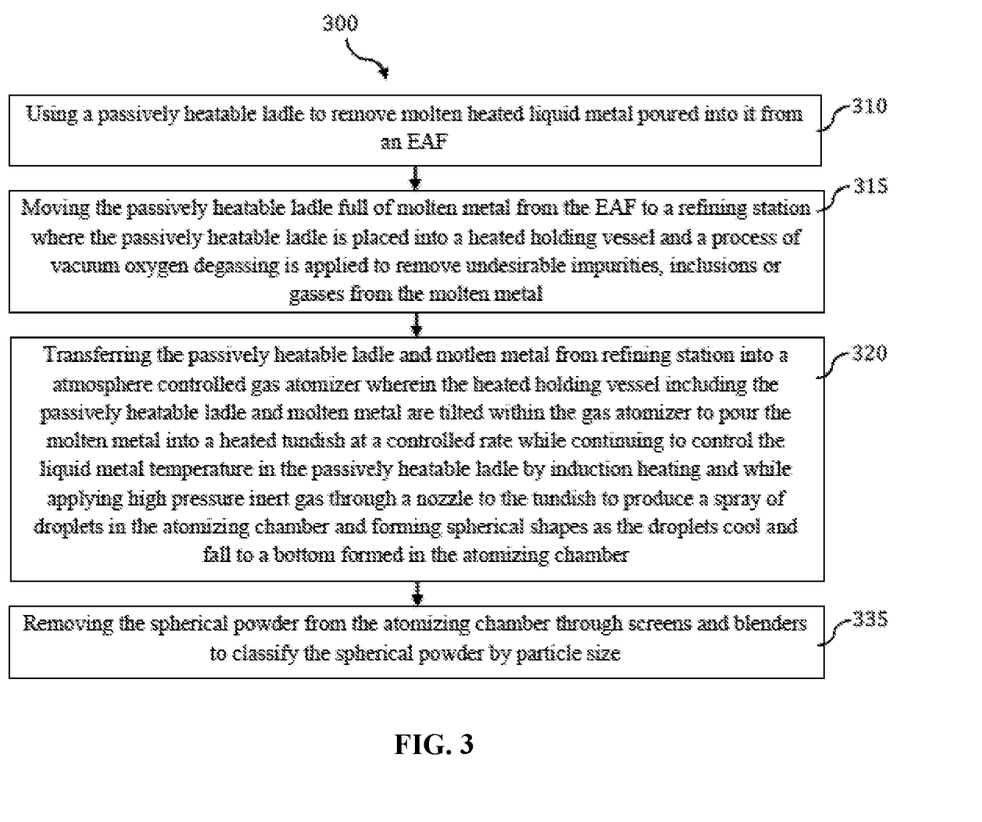
FIG. 3 illustrates a flow diagram for a process in accordance with features of the embodiments.

Referring to FIG. 3, illustrated is another flow diagram in accordance with features of the embodiments. Block 310 illustrates a step of using a passively heatable ladle 111 to remove molten heated liquid metal poured into it from an EAF 105. Then as shown in Block 315, the passively heatable ladle 111 full of molten metal is moved from the EAF 105 to a refining station 120 where the passively heatable ladle is placed into a inductively heated refining holding vessel 117 and a process of vacuum oxygen decarburization is applied to remove undesirable impurities, inclusions or gasses from the molten metal. In Block 320, the passively heatable ladle 111 and molten metal contained t h ere in are transferred from refining station 120 into a atmosphere controlled gas atomizer station 140 wherein an inductively heated atomizer holding vessel 131 including the passively heatable ladle 111 and molten metal contained therein are tilted to pour the molten metal into a heated tundish 150 at a controlled rate while continuing to control the liquid metal temperature in the passively heatable ladle 111 by induction heating from the inductively heated atomizer holding vessel 131 and while applying high pressure inert gas through a nozzle 155 coupled the tundish 150 to produce a spray of droplets in the atomizing chamber 157 and forming spherical shapes as the droplets cool and fall to a bottom formed in the atomizing chamber 157. Then as shown in Block 325, illustrated is a step of removing the spherical powder 159 from the atomizing chamber 157 to the discharge hopper 158, which will be used to deliver the spherical powder for classification by particle size through a series of screens and blenders.

Figure 4:
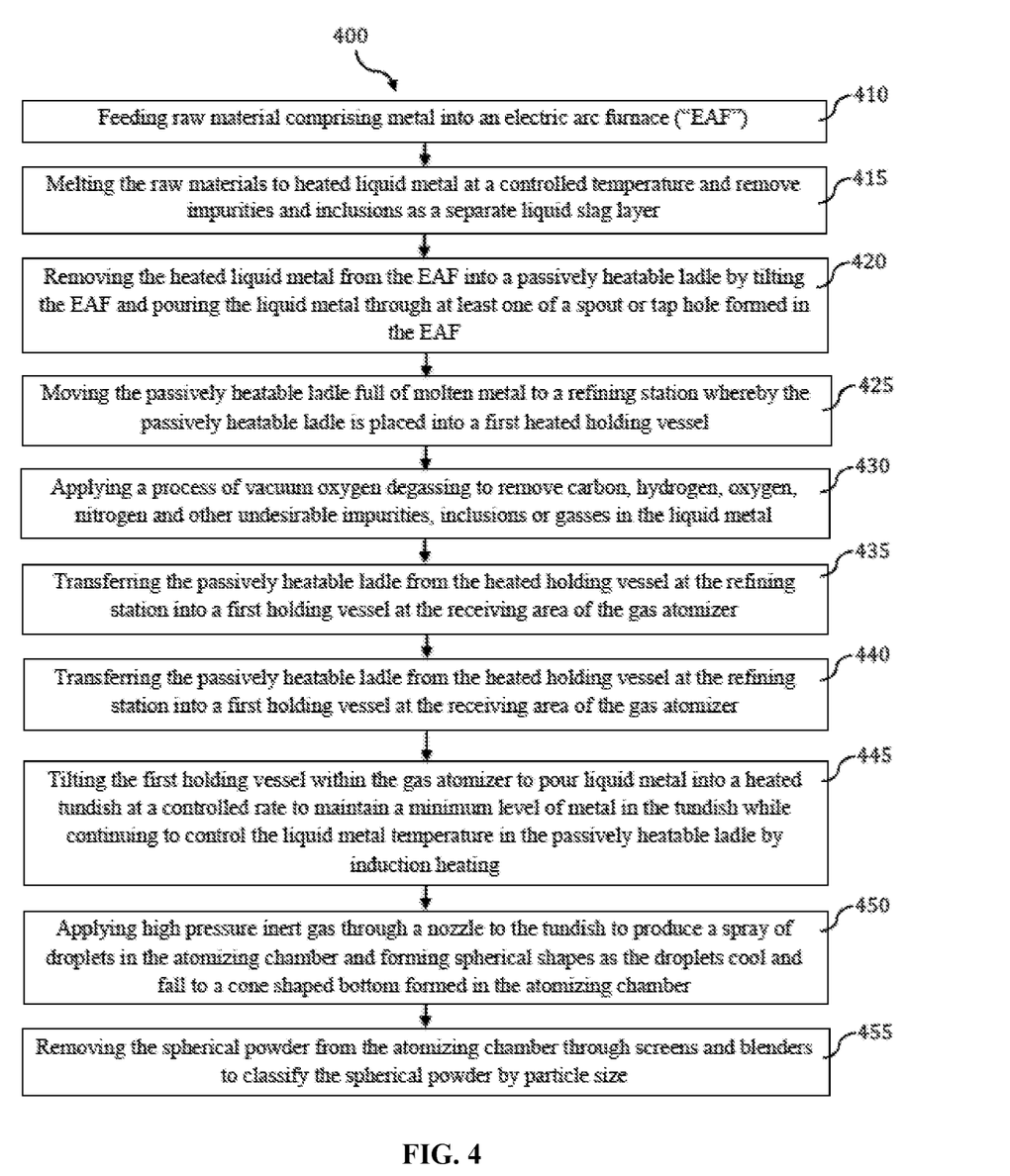
FIG. 4 illustrates flow diagram for a process in accordance with features of the embodiments.
Figure 5:
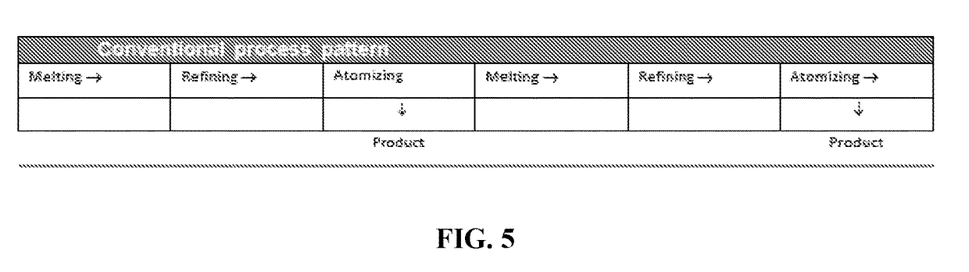
FIG. 5 illustrates a flow diagram for a VIGA production system for gas atomized metal powders.
Figure 6:
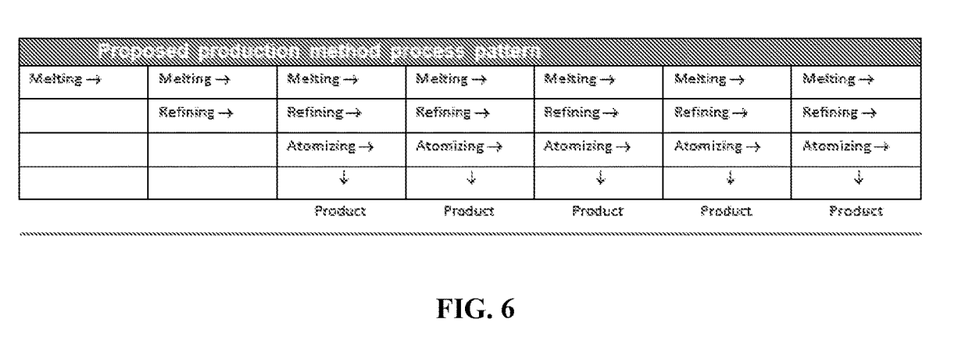
FIG. 6 illustrates a flow diagram for a process in accordance with features of the embodiments.

Referring to FIG. 4, another flow diagram is illustrated in accordance with features of the embodiments. Referring to Block 410, a first step is shown of feeding raw material comprising metal into an electric arc furnace ("EAF") 105. Then as shown in Block 415, raw materials are melted into heated liquid metal at a controlled temperature and impurities and inclusions are removed as a separate liquid slag layer. Then as shown in Block 420, the heated liquid metal is removed from the EAF 105 into a passively heatable ladle 111 by tilting the EAF 105 and pouring the liquid metal through at least one of a spout or tap hole 103 formed in the EAF 105. In Block 425, a step of moving the passively heatable ladle 111 full of molten metal 101 to a refining station 120 whereby the passively heatable ladle 111 is placed into a first heated holding vessel 117 is shown. Then in Block 430, a process of vacuum oxygen decarburization is applied to remove carbon, hydrogen, oxygen, nitrogen and other undesirable impurities, inclusions or gasses in the liquid metal. Then in Block 435, the passively heatable ladle 111 is transferred from the heated holding vessel 117 at the refining station 120 into a first holding vessel 131 near the receiving area 141 of the gas atomizer station 140. In Block 440, the passively heatable ladle 111 is then transferred from the heated holding vessel 117 at the refining station 120 into a first holding vessel 131 at the receiving area 141 of the gas atomizer station 140. In Block 445, the first holding vessel 131 is tilted within the gas atomizer station 140 to pour liquid metal into a heated tundish 150 at a controlled rate to maintain a minimum level of metal in the tundish 150 while continuing to control the liquid metal temperature in the passively heatable ladle 111 by induction heating. In Block 450, high pressure inert gas is applied through a nozzle 155 at or beneath the tundish 150 to produce a spray of droplets in the atomizing chamber 157 and form spherical shapes of powder 159 as the droplets cool and fall to a cone shaped bottom 156 formed in the atomizing chamber 157. Then, as shown in Block 455, the spherical powder 159 can be removed from the atomizing chamber 157 to the discharge hopper 158, used to deliver the powder to a series of screens and blenders to classify the spherical powder by particle size.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein could be subsequently made by those skilled in the art, which are also intended to be encompassed by the following claims.

The invention claimed is:

1. A method for producing atomized metal powders, comprising the steps of:
   a) feeding raw materials comprising metal into a furnace;
   b-1) melting the raw materials into molten metal;
   b-2) removing impurities as a separate liquid slag layer forming on top of the molten metal within the furnace;
   c) removing the molten metal from the furnace into a passively heatable ladle by tilting the furnace and pouring the liquid metal through at least one of a spout or tap hole formed in the furnace;
   d) moving the passively heatable ladle full of molten metal into an inductively heated refining holding vessel, wherein the inductively heated refining holding vessel is configured to generate a first electromagnetic field and inductively produce heat inside the inductively heated refining holding vessel and further heat the molten metal inside the passively heatable ladle to thereby maintain the molten metal in a liquid state;
   e) moving the inductively heated refining holding vessel through a refining station and applying a process of vacuum oxygen decarburization to remove undesirable impurities, inclusions or gasses from the liquid metal, while controlling the molten metal temperature with the first electromagnetic field by inductively heating the molten metal held inside the passively heatable ladle;
   f) moving the passively heatable ladle from the inductively heated refining holding vessel into an inductively heated atomizer holding vessel located near a first receiving area of a gas atomizer, wherein the inductively heated atomizer holding vessel is configured to generate a second electromagnetic field and thereby inductively produce heat inside the inductively heated atomizer holding vessel via the passively heatable ladle to thereby maintain the molten metal in a liquid state;
   g) moving the inductively heated atomizer holding vessel containing the passively heatable ladle through at least one atmosphere controlling door into the gas atomizer, while controlling the liquid metal temperature within the ladle by continually applying the second electromagnetic field to the inductively heated atomizer holding vessel to inductively heat the molten metal held by the passively heatable ladle, wherein the gas atomizer houses a controlled vacuum and inert atmosphere chamber;
   h) tilting the inductively heated atomizer holding vessel within the gas atomizer to pour the molten metal from the passively heatable ladle into a tundish that is located in the controlled vacuum and inert atmosphere chamber within the gas atomizer, wherein pouring of the molten metal is at a controlled rate to maintain a minimum level of molten metal in the tundish while continuing to control the liquid metal temperature by applying the second electromagnetic field through the passively heatable ladle to the molten metal;
   i) applying high pressure inert gas through a nozzle to a stream of liquid metal flowing out from the tundish into an atomizing chamber to produce a spray of droplets and form spherical shapes as the droplets cool and fall into a cone shaped bottom formed in the atomizing chamber; and
   j) removing the spherical powder from the atomizing chamber through a discharge hopper.

2. The method of claim 1, wherein the separate liquid slag layer is removed from the furnace before step c) of removing the molten metal from the furnace into a passively heatable ladle by tilting the furnace towards a slag door and allowing the separate liquid slag to pour out of the furnace into a slag pot.

3. The method of claim 1, wherein the passively heatable ladle is largely transparent to electromagnetic radiation wavelengths thereby enabling the liquid metal contained therein to be heated by electromagnetic energy without overheating the passively heatable ladle itself.

4. The method of claim 1, wherein the molten metal is also heated in the tundish via an electromagnetic field.

5. The method of claim 1, wherein the spherical powder is removed from the atomizing chamber and delivered to a series of screens and blenders to classify the spherical powder as a product by particle size.

6. The method of claim 1, wherein the undesirable impurities, inclusions or gases include at least one of carbon, hydrogen, oxygen, and nitrogen.

7. The method of claim 1, wherein the refining station is a Vacuum Oxygen Decarburization system.

8. The method of claim 1, further comprising the steps of:
   k) removing the passively heatable ladle from the inductively heated atomizer holding vessel within the gas atomizer and returning the passively heatable ladle to the furnace to repeat steps (a) through (i); and l) Receiving a subsequent passively heatable ladle into a second inductively heated atomizer holding vessel located within the gas atomizer after the subsequent passively heatable ladle has undergone and completed steps c) through e) in place of the subsequent passively heatable ladle and repeating steps (g) through (i);

m) transferring the subsequent passively heatable ladle from the inductively heated refining holding vessel at the refining station into a cavity of a subsequent inductively heated atomizing holding vessel located near a first receiving area of the gas atomizer, wherein the subsequent inductively heated atomizing holding vessel is also configured to generate an electromagnetic field and thereby inductively produce heat inside the cavity of the subsequent inductively heated atomizing holding vessel via the subsequent passively heatable ladle to thereby maintain the molten metal in a liquid state;

n) moving the subsequent inductively heated atomizing holding vessel by a mechanical means through the atmosphere controlling series of doors into the gas atomizer and next to a controlled vacuum and inert atmosphere chamber, while controlling the liquid metal temperature by continually applying the electromagnetic field for inductively heating the molten metal held by the subsequent passively heatable ladle;

o) tilting a subsequent inductively heated atomizing holding vessel containing a subsequent passively heatable ladle further containing molten metal within the gas atomizer to pour the molten metal from the subsequent passively heatable ladle through the controlled vacuum and inert atmosphere chamber and into the tundish located in the controlled vacuum and inert atmosphere chamber, wherein the subsequent passively heatable ladle previously completed steps of transferring the subsequent passively heatable ladle from the inductively heated refining holding vessel at the refining station into a cavity of the subsequent inductively heated atomizing holding vessel located near the receiving area and a second receiving area of the gas atomizer, the subsequent holding vessel also configured to generate an electromagnetic field and thereby inductive produce heat inside a cavity of the subsequent inductively heated atomizer holding vessel via the subsequent passively heatable ladle to thereby maintain molten metal in a liquid state, and moving the subsequent inductively heated atomizer holding vessel by a subsequent mechanical means through at least one atmosphere controlling doors into the gas atomizer and next to the controlled vacuum and inert atmosphere chamber, while controlling the molten metal temperature by continually applying an electromagnetic field from the subsequent inductively heated atomizer holding vessel for inductively heating the molten metal held by the subsequent passively heatable ladle, and wherein pouring of the molten metal from the subsequent passively heatable ladle is at a controlled rate to maintain a minimum level of molten metal in the tundish while continuing to control the liquid metal temperature by applying the electromagnetic field through the passively heatable ladle to the molten metal;

p) applying high pressure inert gas through a nozzle to a stream of liquid metal flowing out from the tundish into the atomizing chamber to produce a spray of droplets in the atomizing chamber and form spherical shapes as the droplets cool and fall into a cone shaped bottom formed in the atomizing chamber; and q) removing the spherical powder from the atomizing chamber through a discharge hopper.

\* \* \* \* \*